US006168847B1

(12) United States Patent

Murphy et al.

(10) Patent No.: US 6,168,847 B1

(45) Date of Patent: Jan. 2, 2001

(54) PRE-FOLDED STOCK MATERIAL FOR USE IN A CUSHIONING CONVERSION MACHINE

(75) Inventors: Cynthia S. Murphy, Chardon; Richard O. Ratzel, Westlake, both of OH (US)

(73) Assignee: Ranpak Corporation, Painesville, OH (US)

(*) Notice: Under 35 U.S.C. 154(b), the term of this patent shall be extended for 0 days.

(21) Appl. No.: 09/026,196

(22) Filed: Feb. 19, 1998

Related U.S. Application Data

(62) Division of application No. 08/584,092, filed on Jan. 11, 1996, now Pat. No. 6,015,374.

(51) Int. Cl.[7] ....... B32B 3/04

(52) U.S. Cl. ....... 428/126; 428/124; 428/121; 428/129; 428/127; 428/128; 493/967; 206/814

(58) Field of Search ....... 428/124, 126, 428/121, 129, 128, 127; 493/967; 206/814

(56) References Cited

U.S. PATENT DOCUMENTS

| | | | | |
|---|---|---|---|---|
| 472,079 | * | 4/1892 | Ross | 428/124 |
| 1,553,955 | | 9/1925 | Parsons | 270/5.02 |
| 1,980,059 | * | 11/1934 | Housen | 221/63 |
| 1,989,794 | * | 2/1935 | Duvall | 428/124 |
| 2,156,501 | * | 5/1939 | Katz | 428/121 |
| 2,619,057 | | 11/1952 | Ellis, Sr. | 112/306 |
| 2,786,399 | | 3/1957 | Mason et al. | 493/369 |
| 3,013,513 | | 12/1961 | Judelson | 112/306 |
| 3,263,898 | * | 8/1966 | Blish | 428/124 |
| 3,323,983 | | 6/1967 | Palmer et al. | 162/362 |
| 3,377,224 | | 4/1968 | Gresham et al. | 156/209 |
| 4,101,026 | * | 7/1978 | Bonk | 206/205 |
| 4,380,485 | | 4/1983 | Schuster | 156/254 |
| 4,528,053 | | 7/1985 | Auer | 156/204 |
| 4,750,896 | | 6/1988 | Komaransky et al. | 493/357 |
| 4,884,999 | | 12/1989 | Baldacci | 493/439 |
| 4,968,291 | | 11/1990 | Baldacci et al. | 493/354 |
| 5,123,889 | | 6/1992 | Armington et al. | 493/357 |
| 5,297,919 | | 3/1994 | Reichental | 414/349 |
| 5,382,464 | * | 1/1995 | Ruppel et al. | 428/172 |

FOREIGN PATENT DOCUMENTS

| | | |
|---|---|---|
| 0523382 | 1/1993 | (EP) . |
| 0679504 | 2/1995 | (EP) . |
| 0650827 | 5/1995 | (EP) . |
| 94/14548 | 7/1994 | (WO) . |
| 95/31296 | 11/1995 | (WO) . |

* cited by examiner

*Primary Examiner*—William P. Watkins, III

(74) *Attorney, Agent, or Firm*—Renner, Otto, Boisselle & Sklar LLP

(57) ABSTRACT

Pre-folded stock material for use in a cushioning conversion machine which converts the pre-folded stock material into a three-dimensional cushioning product. The stock material includes at least one ply having a plurality of layers at two of which are joined at a longitudinally extending fold. The stock material is preferably biodegradable, recyclable, and reusable paper and may be supplied in a roll or in a fan-folded stack.

12 Claims, 12 Drawing Sheets

PRE-FOLDED STOCK MATERIAL FOR USE IN A CUSHIONING CONVERSION MACHINE

This application is a divisional continuation application of U.S. patent application Ser. No. 08/584,092, filed on Jan. 11, 1996 now U.S. Pat. No. 6,015,374 and entitled "Compact Cushioning Conversion Machine and Method Using Pre-Folded Paper." The entire disclosure of this earlier application is hereby incorporated by reference.

FIELD OF THE INVENTION

The herein described invention relates generally to a cushioning conversion machine and method for converting sheet-like stock material into a cushioning product and, more particularly, to a way of supplying the stock material to the conversion machine which enables the provision of a more compact conversion machine.

BACKGROUND OF THE INVENTION

In the process of shipping an item from one location to another, a protective packaging material is typically placed in the shipping case, or box, to fill any voids and/or to cushion the item during the shipping process. Some conventional protective packaging materials are plastic foam peanuts and plastic bubble pack. While these conventional plastic materials seem to adequately perform as cushioning products, they are not without disadvantages. Perhaps the most serious drawback of plastic bubble wrap and/or plastic foam peanuts is their effect on our environment. Quite simply, these plastic packaging materials are not biodegradable and thus they cannot avoid further multiplying our planet's already critical waste disposal problems. The non-biodegradability of these packaging materials has become increasingly important in light of many industries adopting more progressive policies in terms of environmental responsibility.

The foregoing and other disadvantages of conventional plastic packaging materials have made paper protective packaging material a very popular alterative. Paper is biodegradable, recyclable and composed of a renewable resource, making it an environmentally responsible choice for conscientious industries.

While paper in sheet form could possibly be used as a protective packaging material, it is usually preferable to convert the sheets of paper into a relatively low density pad-like cushioning dunnage product. Cushioning conversion machines in use today have included a forming device and a feeding device which coordinate to convert a continuous web of sheet-like stock material (either single-ply or multi-ply) into a three dimensional cushioning product, or pad. The forming device is used to fold, or roll, the lateral edges of the sheet-like stock material inward on itself to form a strip having a width substantially less than the width of the stock material. The feeding device advances the stock material through the forming device and it may also function as a crumpling device and a connecting (or assembling) device. The cushioning conversion machine may also include a ply separating device for separating the plies of the web before passing through the former, and usually a cutting assembly for cutting the strip into sections of desired length.

In many packaging facilities the size of the cushioning conversion machine is of minor importance. However, in other facilities space may be quite limited and the size of the cushioning conversion machine is of considerable importance. Also, a reduction in the size of a cushioning conversion machine provides various advantages such as lower shipping costs, easier delivery, more efficient service procedures, decreased need for storage space, etc.

Successful attempts have been made over the years by Ranpak Corp. of Painesville, Ohio, U.S.A., the assignee of the present application, to reduce the size of cushioning conversion machines. For example, the cushioning conversion machine marketed under the trademark PadPak® (or PadPak Sr.™) and disclosed in U.S. Pat. No. 4,968,291 is approximately 42 inches high, 36 inches wide and 67 inches long, not including any stock roll mount. The cushioning conversion machine sold under the trademark AutoPad® and disclosed in U.S. Pat. No. 5,123,889 has a length of about 59 inches, a width of about 34 inches and a height of about 12 inches, not including any stock roll mount. Roughly, the AutoPad® machine is no more than about one third the size of the PadPak® machine while still producing a cushioning product of substantially identical properties. A further size reduction is exhibited by the machine marketed under the trademark PadPak Jr.™ (or Junior™) and disclosed in U.S. patent application Ser. No. 08/486,811, filed on Jun. 7, 1995 U.S. Pat. No. 5,618,131. The PadPak Jr.™ machine is about 49 inches long, about 29 inches wide and about 12 inches high, not including any stock roll mount and operating handle.

In the foregoing and other types of conversion machines the forming device, by the nature of its function, occupies a significant portion of the overall volume of the machine. The forming device has heretofore been considered an essential component of the machine, notwithstanding continuing efforts to provide compact conversion machines for applications where machine size is important.

SUMMARY OF THE INVENTION

The present invention provides a novel cushioning conversion machine and method for converting sheet-like stock material into a cushioning product without the use of a conventional forming device, thereby enabling a substantial reduction in the size of the machine. The machine and method are characterized by the use of a web of flat-folded sheet-like stock material of one or more plies and an expanding device which is operative to open up, or "expand", the flat-folded stock material before passage through a crumpling and/or connecting device which also preferably functions to advance the stock material through the machine. A preferred device for feeding, crumpling and connecting (assembling) the expanded stock material includes upstream and downstream feed components which are driven at different speeds, the upstream feed component being driven faster than the downstream feed component to effect a crumpling action therebetween. The upstream feed component preferably imparts to the expanded stock material an alternating side-to-side pulling/pushing action while the downstream feed component effects final assembly of the crumpled strip to provide a connected strip of cushioning product that may then be segmented into sections, as by cutting, to form cushioning products of desired length.

The invention also provides a stock supply including at least one ply of sheet-like stock material having portions thereof folded upon themselves along the length of the stock material. The single-ply or multi-ply material preferably is tri-folded with lateral edge portions thereof folded over on one another and on a central portion.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

DETAILED DESCRIPTION

Figure 1:
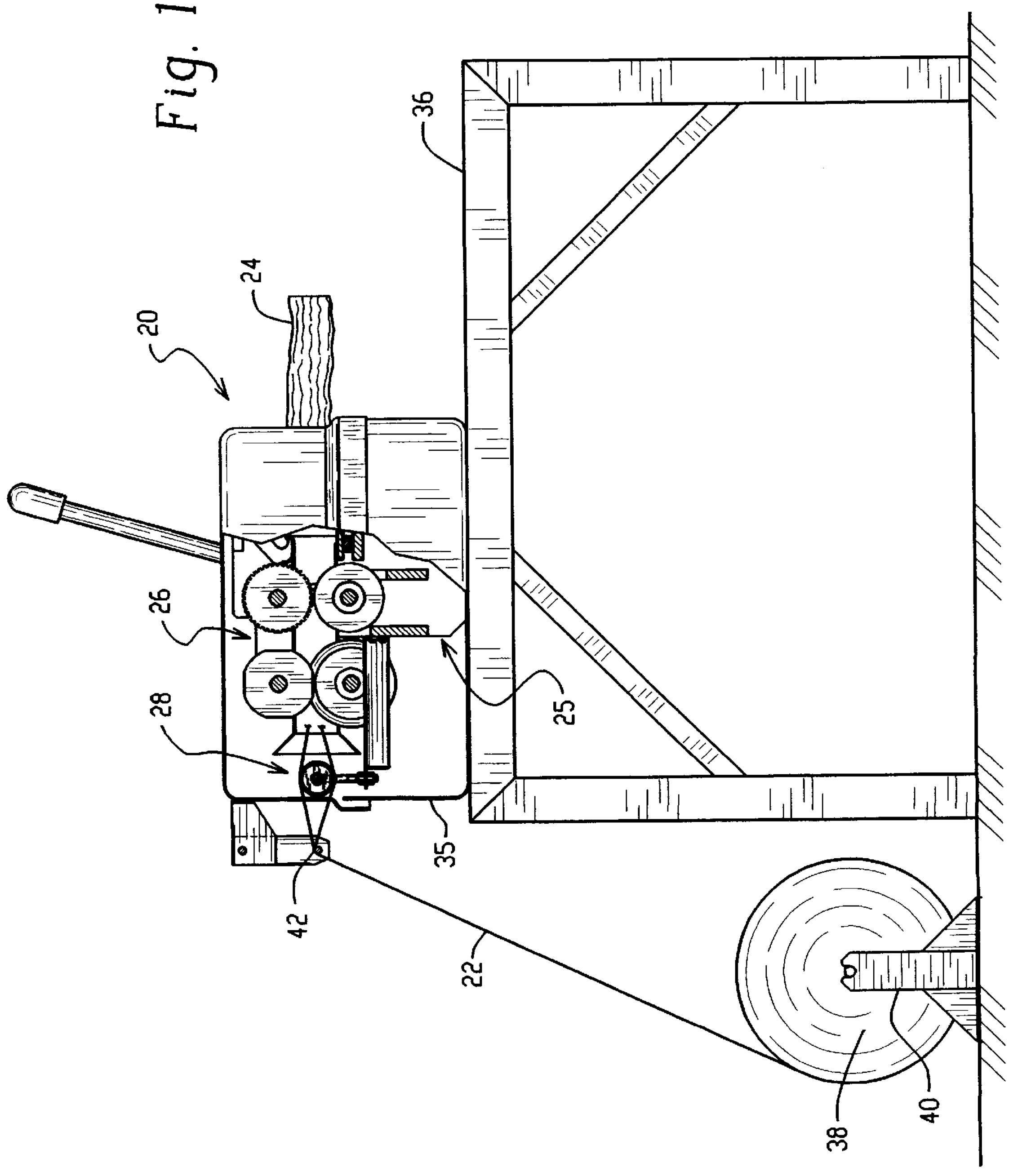
FIG. 1 is a schematic side view of a cushioning conversion machine according to the invention with the side wall of the machine's housing nearest the viewer partly broken away to permit viewing of internal machine components, and with the machine situated on a table and being supplied with pre-folded stock material from a floor supported stock supply.
Figure 2:
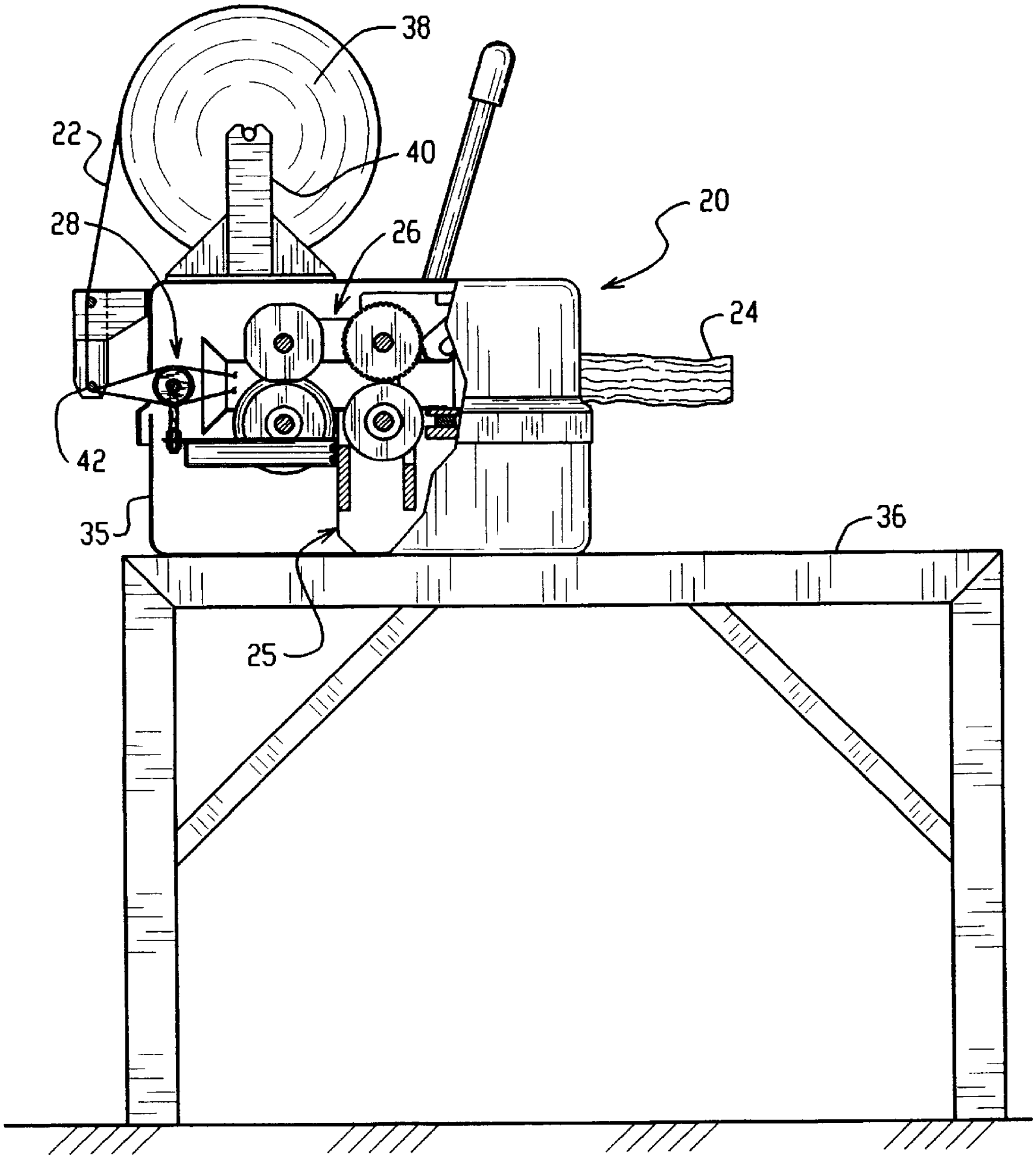
FIG. 2 is a schematic side view of a cushioning conversion machine according to the invention, again with the side wall of the machine's housing nearest the viewer partly broken away to permit viewing of internal machine components and with the machine situated on a table, but with pre-folded stock material being supplied from an elevated stock supply.

Referring now in detail to FIGS. 1 and 2, an exemplary embodiment of a cushioning conversion machine according to the invention is designated generally by reference numeral 20. The illustrated machine 20 converts flat-folded sheet-like stock material 22 into a three-dimensional cushioning product, or pad, 24.

Figure 15:
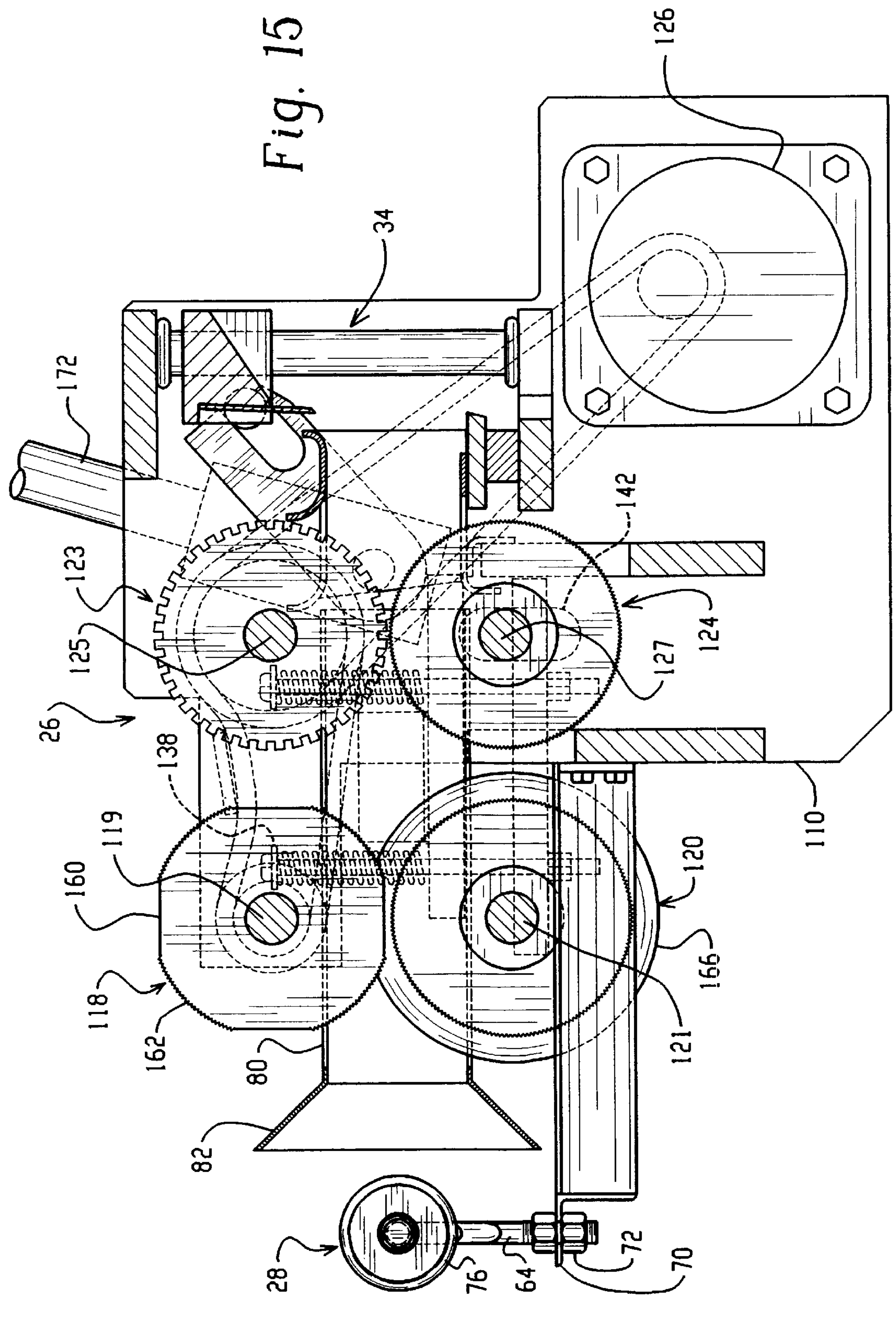
FIG. 15 is a sectional view of the machine taken along the line 15—15 of FIG. 14, showing in particular the feed, crumpling and assembly device.

The machine 20 includes a frame 25 to which are mounted a feeding, crumpling and assembling device 26 and an expanding device 28. As explained in greater detail below, the device 26 advances the flat-folded stock material 22 through the expanding device 28 which causes adjacent portions of the flat-folded stock material to be pulled apart or separated prior to passing into the device 26 where it is crumpled and assembled into a connected strip, i.e., the cushioning product 24. The machine also includes a device of any desired construction for segmenting or dividing the connected strip into sections of desired length, which device is, for example, the illustrated cutting assembly 34 (FIG. 15). The machine preferably is provided with an outer casing 35 which encloses the frame and other interior components of the machine.

The roles the aforesaid conversion assemblies 26 and 28, and components thereof, play in the formation of such a cushioning product are explained below in detail. In regard to the various functions performed by the noted assemblies and components thereof, the terms (including a reference to a "means") used to identify the herein-described assemblies and devices are intended to correspond, unless otherwise indicated, to any assembly/device which performs the specified function of such an assembly/device that is functionally equivalent even though not structurally equivalent to the disclosed structure which performs the function in the illustrated exemplary embodiment of the invention.

In accordance with a preferred embodiment of cushioning conversion machine according to the invention, the major components of such conversion machine are the feeding, crumpling and assembling device 26, the expanding device 28, and the dividing device 34 (FIG. 15). Noticeably absent in relation to the above mentioned prior art machines is a forming device which inwardly rolls, or folds, the stock material into a narrower width three-dimensional strip having a width approximating the width of the final cushioning product. The elimination of a conventional former permits a great reduction in the size, and particularly the length and width of the machine, as compared to conventional machines. Specifically, the illustrated preferred embodiment (excluding the operating handle) is about 18 inches in length, about 18 inches in width and about 12 inches in height for an overall volume reduction of about 85% when compared to the above mentioned AutoPad® machine that produces a pad of approximately the same width and height.

In FIGS. 1 and 2, the machine 20 is shown supported on a table 36 and the stock material 22 is supplied from a stock roll 38 supported by a mount 40. In FIG. 1 the mount is positioned on the floor and the stock material is fed upwardly to the machine, whereas in FIG. 2 the mount is positioned on top of the machine with the stock material being fed downwardly to the machine. In either case and regardless of the angle at which the stock material is fed from a supply thereof to the machine, a constant entry guide 42 at the upstream end of the machine properly directs the stock material into the expanding device 28.

Figure 3:
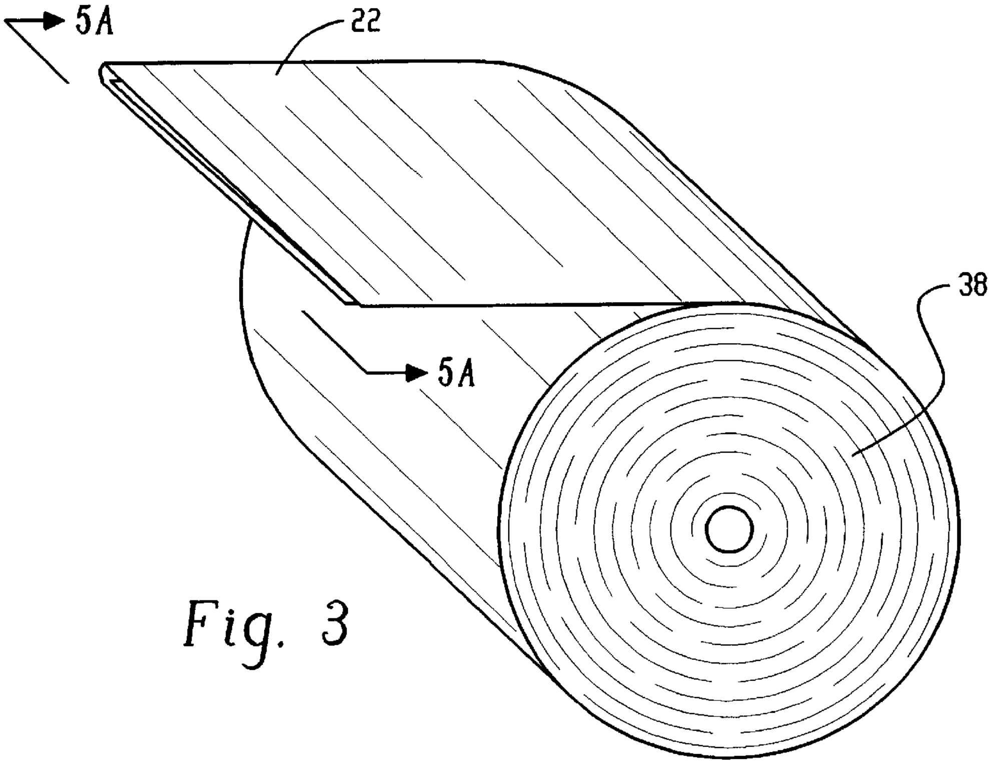
FIG. 3 is a perspective view of a roll of flat-folded stock material for use with the cushioning conversion machine.
Figure 4:
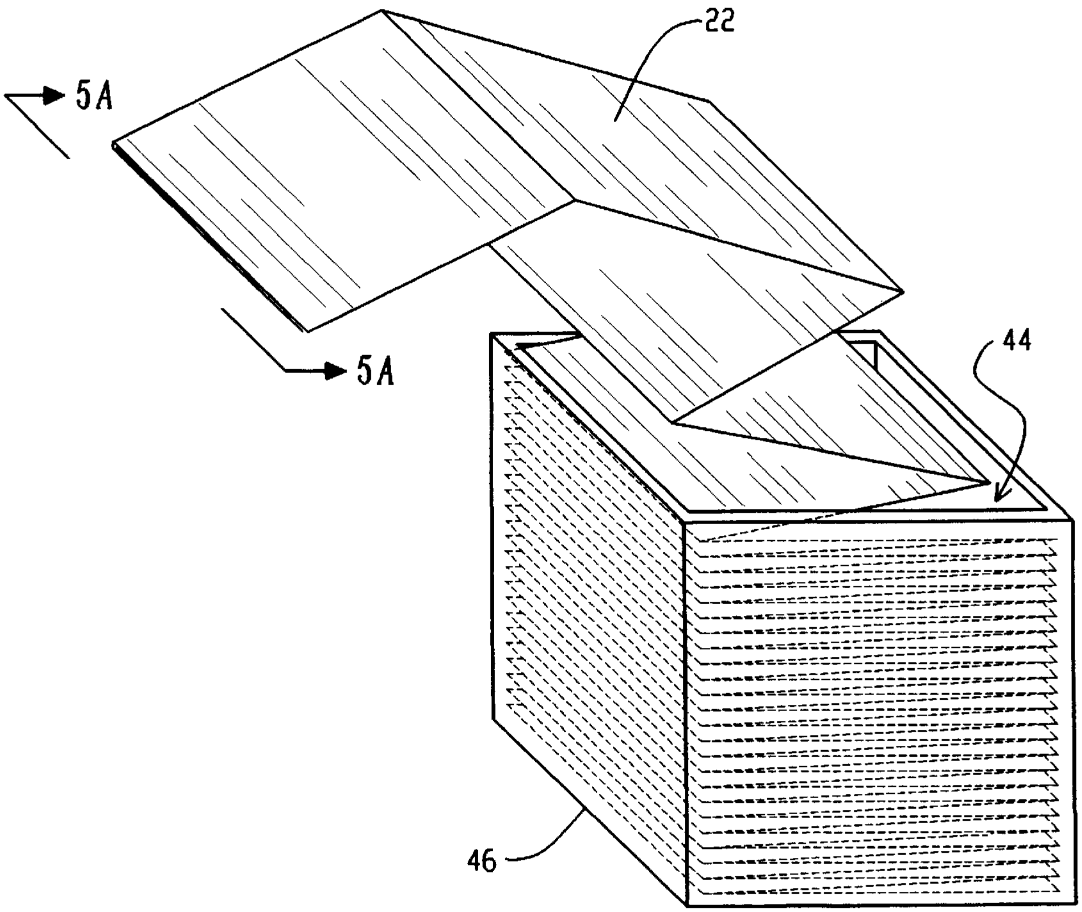
FIG. 4 is a perspective view of a fan-folded stack of flat-folded stock material for use with the cushioning conversion machine.

As shown in FIGS. 1–3, the pre-folded, flat-folded stock material 22 may be supplied in roll form, i.e., as the stock roll 38. Alternatively, the stock material may be supplied as a fan-folded stack 44 as shown in FIG. 4. For a discussion of the benefits obtained by using a fan-folded stack of stock material, reference may be had to U.S. Pat. No. 5,387,173. As shown in FIG. 4 the stack 44 may be contained in a carton 46 having an open top from which the stock material is dispensed for passage through the conversion machine.

Regardless of the mode of supply (roll, stack or otherwise), the stock material 22 consists of a web of flat-folded sheet-like stock material of one or more plies having portions thereof folded upon themselves along the length of the stock material. Preferably, the stock material 22 comprises at least two and preferably two or three superimposed plies each preferably 27–30 inches wide prior to being folded. A preferred stock material consists of a biodegradable, recyclable and reusable material such as paper and more particularly 30–50 pound basis weight Kraft paper.

Figure 5A:
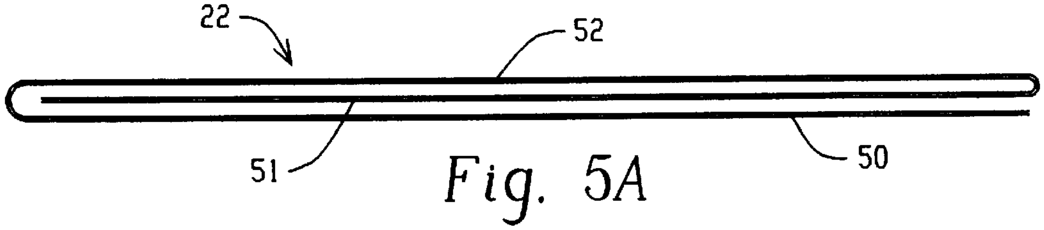
FIG. 5A is an end view of the flat-folded stock material of FIGS. 3 and 4, looking from the line 5A—5A thereof.
Figure 5B:
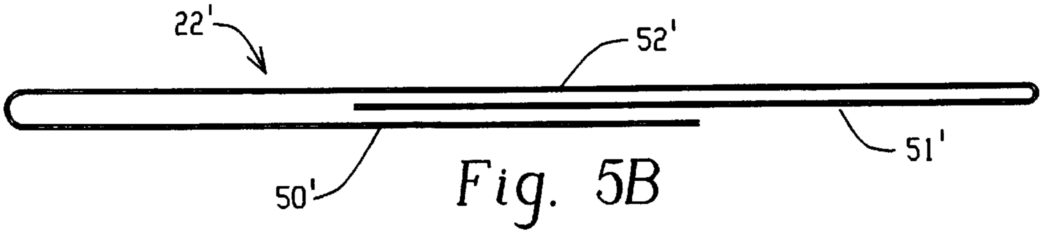
FIG. 5B is an end view of another version of the flat-folded stock material.
Figure 5C:
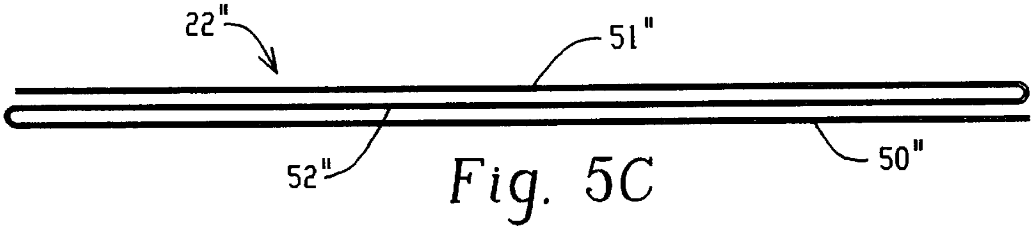
FIG. 5C is an end view of still another version of the flat-folded stock material.

In one form of flat-folded stock material 22 shown in cross-section in FIG. 5A, the single-ply or multi-ply material is tri-folded with opposite lateral edge portions 50 and 51 thereof folded over on one another and on a central portion 52. The lateral edge and central portions may be of approximately equal width for use in a conversion machine according to the invention. However, the width of the lateral edge portions may be varied. In FIG. 5B another form of stock material 22' has lateral edge portions 50' and 51' that are about equal width but less than the width of the central portion 52'. Also, as illustrated in FIG. 5C, the edge portions 50" and 51" may be folded over opposite sides of the central portion 52" to give the web 22" of stock material a Z-shape.

In each one of these embodiments, the lateral edge and central portions of the stock material ply or plies form a plurality of layers joined at a longitudinally extending fold to at least one other layer. In the folded condition of the stock material, the layers of the stock material lay flat one atop the other. However, upon separation of the layers from adjacent layers, generally V-shape or U-shape channels are formed with folds disposed at or near the bottoms of the channels.

Figure 7:
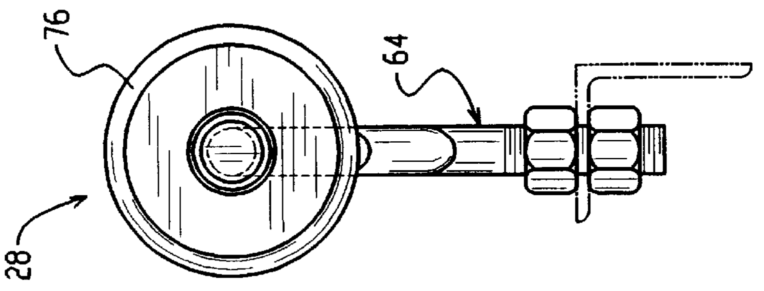
FIG. 7 is a side view of the expanding device of FIG. 6, without the stock material.
Figure 6:
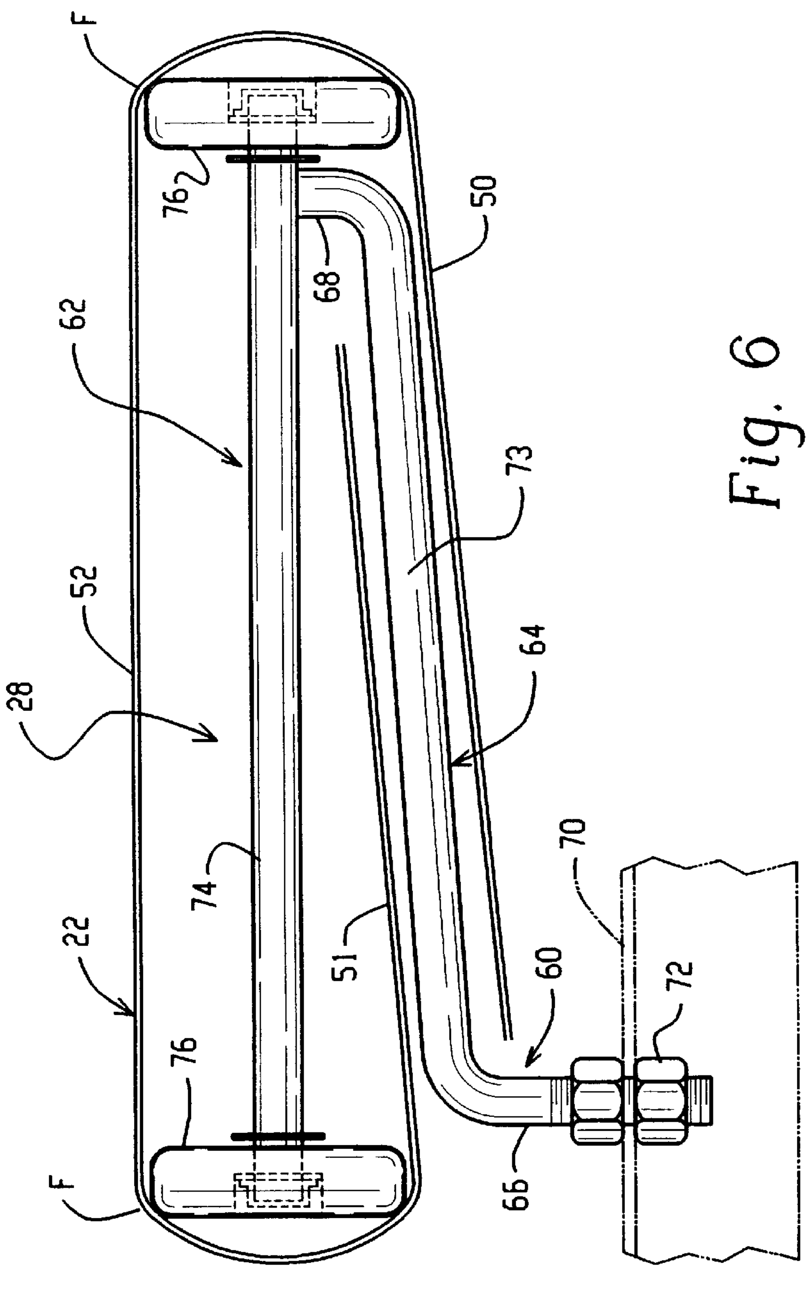
FIG. 6 is an end view of an expanding device employed in the cushioning conversion machine, the device being shown with the flat-folded stock material of FIG. 5A expanded thereby.

In FIGS. 6 and 7, details of the expanding device 28 are shown. The expanding device includes a mounting member 60 to which a separating member 62 is joined. The mounting member 60 includes a transverse support or mounting arm 64 having an outwardly turned end portion 66 and an oppositely turned end portion 68 to which the separating member 62 is attached. The outer end portion 66 is mounted to the machine's frame 25 (FIG. 1) by a bracket 70 and suitable fastening elements 72. The mounting member may be formed from bar or tube stock, and the cantilevered central portion 73 thereof may be sloped relative to a transverse center plane of the path of the stock material through the machine as best illustrated FIG. 14.

The separating member 62 includes a transverse support 74 and fold expansion elements 76 at opposite ends of the transverse support that are relatively thicker than the transverse support, with respect to the narrow dimension of the stock material. In the illustrated expanding device, the mounting member 60 is formed by a rod or tube, and the fold expansion elements are formed by rollers supported for rotation on the transverse support at opposite ends thereof. The transverse support 74 is attached near one end thereof to the adjacent end portion 68 of mounting member 64 for support in cantilevered fashion.

Figure 14:
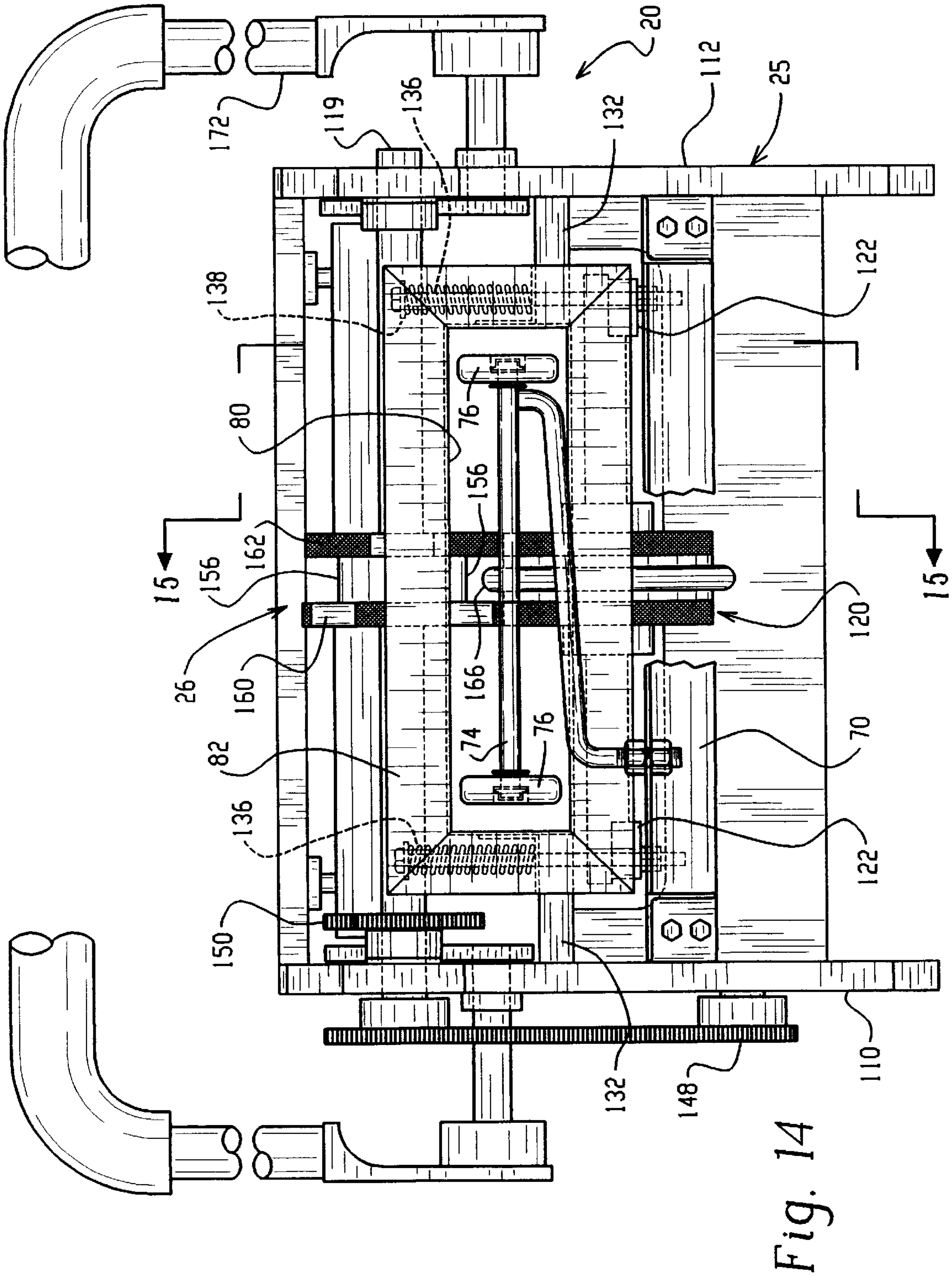
FIG. 14 is an end view of the cushioning conversion machine, showing the expanding device of FIGS. 6 and 7 positioned relative to other components of the machine.

As shown in FIGS. 14 and 15, the mounting member 64 positions the separating member 62 in alignment with a guide chute 80 that has a funnel or converging mouth inlet 82. The guide chute 80 is substantially rectangular in cross-section. It further will be appreciated that the separating member has a width approximating the width of the cushioning product 24, which width corresponds closely to the width of the guide chute 80, and the rollers 76 have a diameter or height approximating the thickness of the cushioning product which closely corresponds to the height of the guide chute 80. Also, in relation to the flat-folded stock material 22 of FIG. 5A, the width of the central portion 52 of the stock material is substantially equal to the width of the separating member (from outer sides of the rollers), such that the folds (or creases) F are proximate the laterally outer corners of the rollers opposite the mounting member, as is preferred.

The expanding device 28 is designed for use with the flat-folded stock material shown in FIG. 5A or 5B. In FIG. 6, the stock material 22 of FIG. 5A is shown in expanded condition. During the conversion process, the layers of the stock material (formed by the edge and central portions of the ply or plies) travel through the expanding device 28. More particularly, the central portion 52 travels over the sides of the rollers 76 opposite the mounting arm 64, while the inner edge portion 51 travels in the narrow V-shape or U-shape slot formed between the transverse support 74 and the mounting arm 64 and the other or outer edge portion 50 travels over the side of the mounting arm 64 furthest the separating member 62. As a result, the edge portions are separated from one another and from the central portion, thereby introducing loft into the then expanded material which now takes on a three dimensional shape as it enters the guide chute 80 (FIG. 14) of the feeding, crumpling and connecting device 26.

Figure 9:
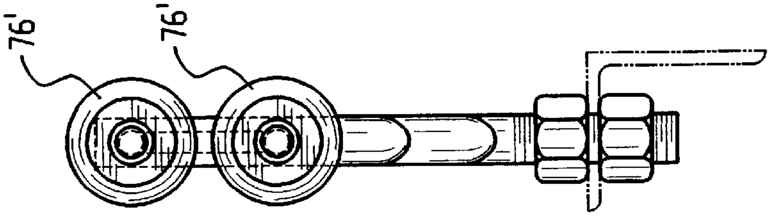
FIG. 9 is a side view of the expanding device of FIG. 8, without the stock material.
Figure 8:
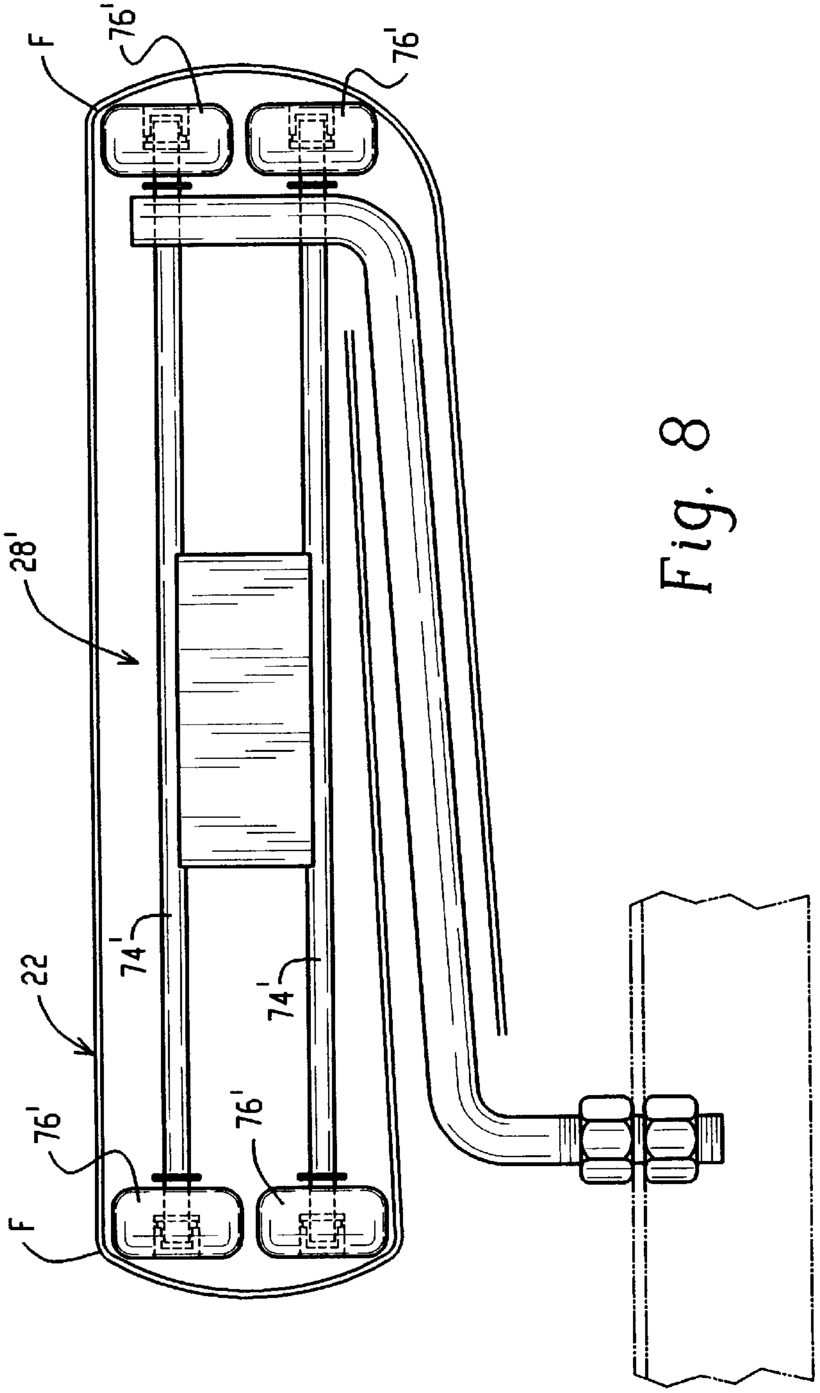
FIG. 8 is an end view of another version of expanding device, the device being shown with the flat-folded stock material of FIG. 5A expanded thereby.

In FIGS. 8 and 9, another version of expanding device is shown at 28'. As shown, the separating member 62' includes a pair of centrally joined transverse support elements 74' to which respective pairs of fold expanding rollers 76' are mounted at the ends of the support elements for rotation. The rollers at each end of the separating member cooperate to expand the adjacent fold F of the stock material. An advantage of two rollers is that they can rotate in opposite directions for more smooth passage of the stock material thereover.

Figure 11:
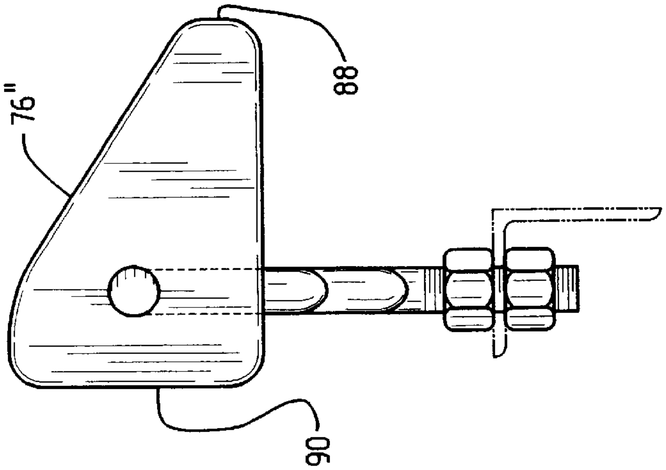
FIG. 11 is a side view of the expanding device of FIG. 10, without the stock material.
Figure 10:
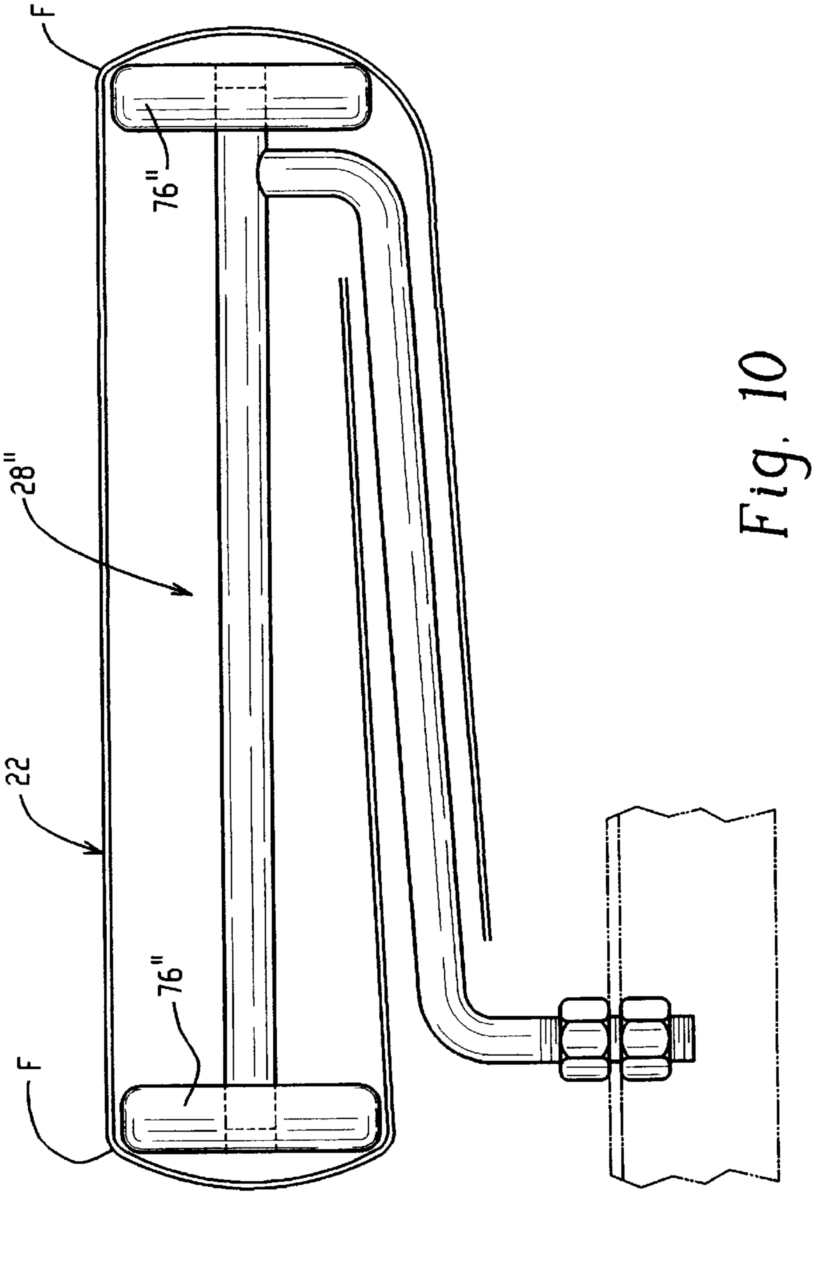
FIG. 10 is an end view of still another version of expanding device, the device being shown with the flat-folded stock material of FIG. 5A expanded thereby.

In FIGS. 10 and 11, still another version of expanding device is shown at 28". In this version, the laterally spaced apart fold expanding elements 76" are in the form of expansion blocks over which the stock material passes. The expansion blocks preferably are wedge shape with the narrow end 88 thereof disposed upstream of the wider end 90. This provides for a progressive guided opening of the stock material folds.

Figure 13:
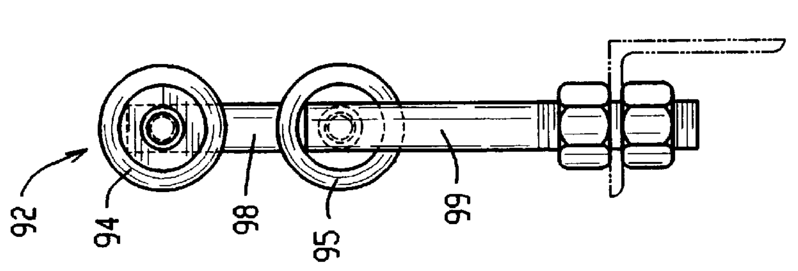
FIG. 13 is a side view of the expanding device of FIG. 12, without the stock material.
Figure 12:
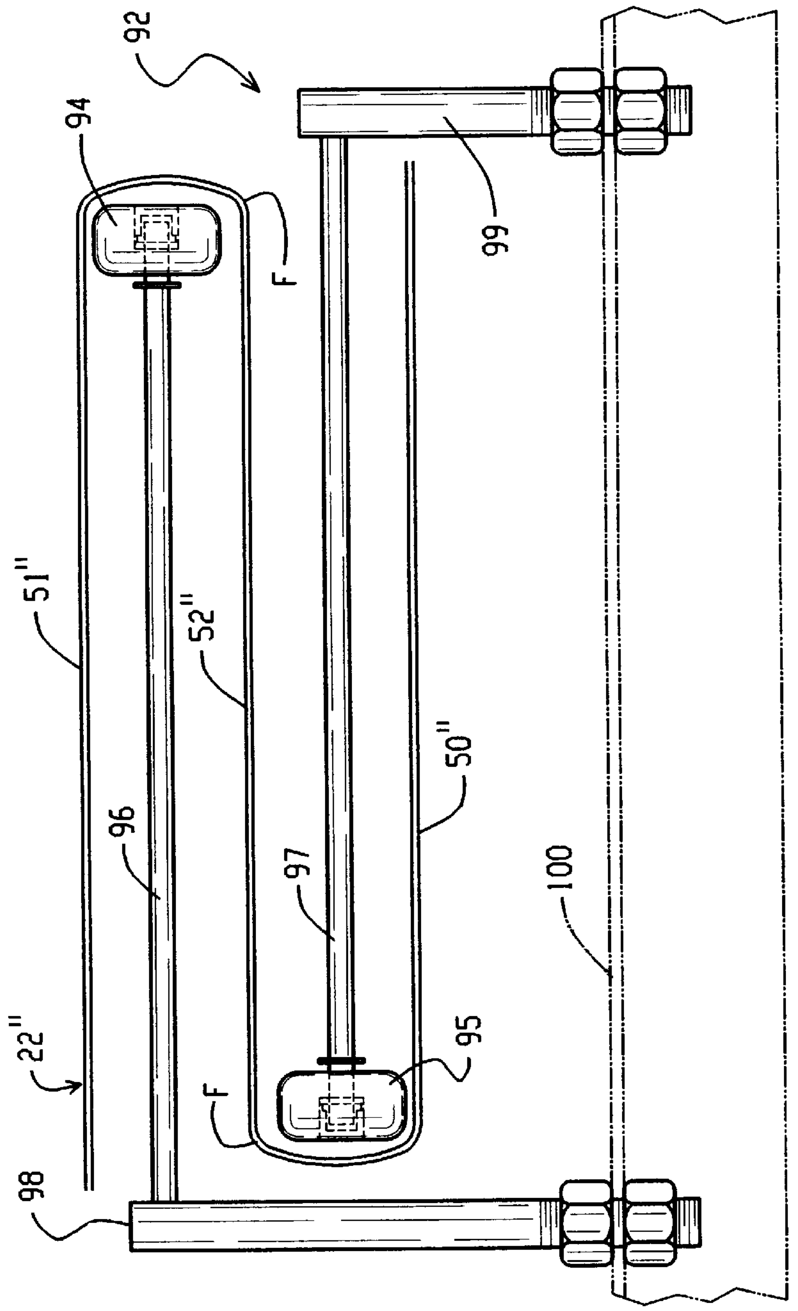
FIG. 12 is an end view of a further version of expanding device, the device being shown with the flat-folded stock material of FIG. 5A expanded thereby.

FIGS. 12 and 13 show at 92 another version of expanding device for use with the flat-folded stock material 22" of FIG. 5C. In this version, fold expansion elements 94 and 95 are rotatably supported at the ends of respective transverse support elements 96 and 97 which are attached at the opposite ends thereof in cantilevered fashion to respective mounting posts 98 and 99. The mounting posts are mounted to a bracket 100 for securement to the frame of the machine. As shown, the support elements are cantilvered in opposite transverse directions. Accordingly, the central portion 52" of the stock material travels through a slot formed between the support elements 96 and 97 whereas the lateral edge portions 50" and 51" travel on opposite outer sides of the support elements as shown in FIG. 12. The expansion elements may be in the form of rollers as shown, but any of the aforesaid expansion elements may be used as desired.

Figure 16:
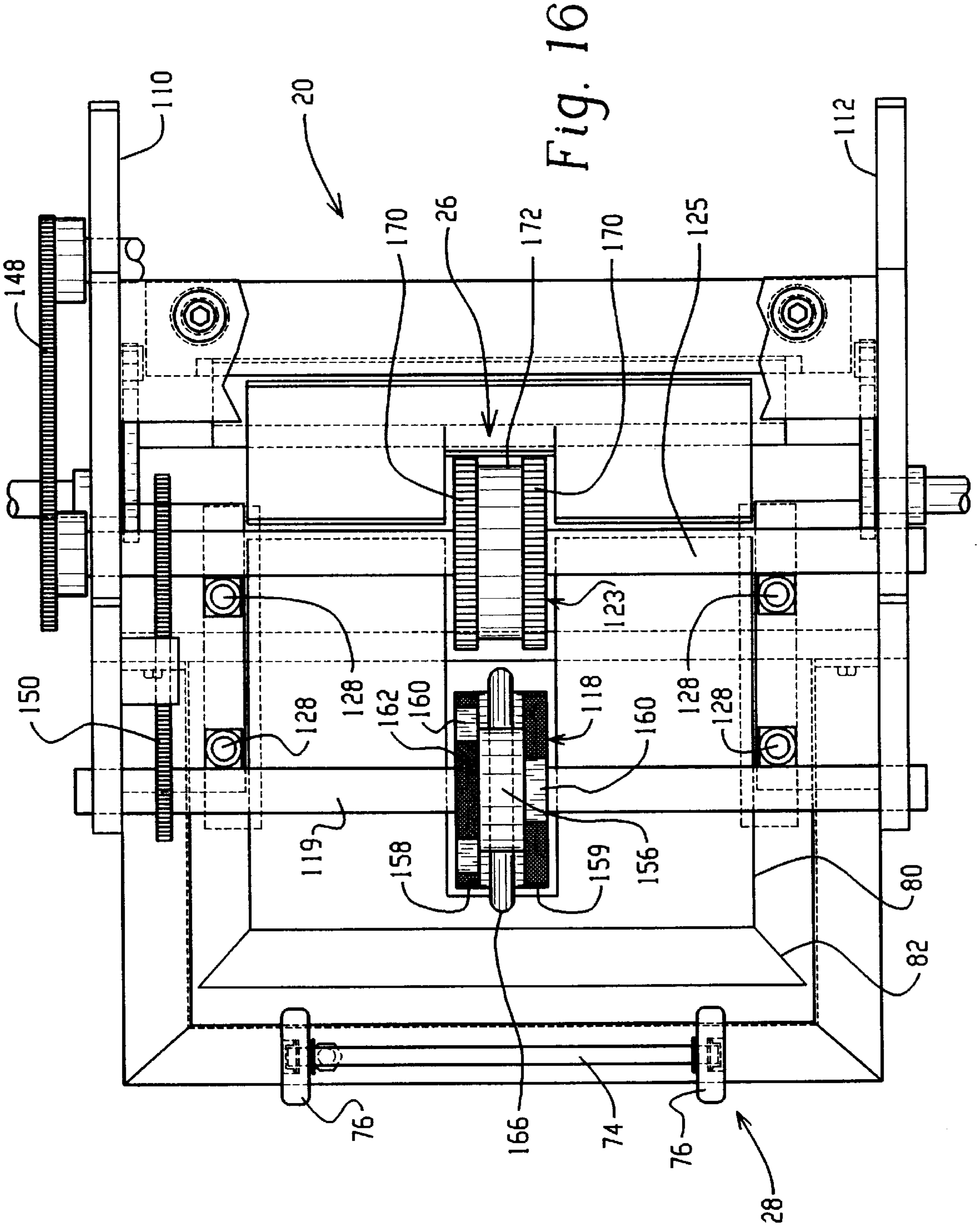
FIG. 16 is a top plan view of the cushioning conversion machine.

Referring now to FIGS. 14–16, wherein further details of the cushioning conversion machine are shown, the frame 25 can be seen to include side plates 110 and 112 which are joined together by transverse frame members. The feeding, crumpling and assembling device 26 includes a first or input pair of wheels, i.e., an upper feed wheel 118 and a lower support wheel 120. The feed wheel 118 is fixed to a shaft 119 that is rotatably supported by and between the side plates 110 and 112. The lower support wheel 120 is supported for rotation on an axle shaft 121 which has opposite ends thereof attached to respective floating supports 122 in the form of bars.

The feeding, crumpling and assembling device 26 further comprises a second or output pair of wheels, i.e., an upper compression wheel 123 and a lower support wheel 124. The compression wheel is fixed to a shaft 125 that is rotatably supported by and between the frame side plates 110 and 112 and rotatably driven by a motor 126, such as an electric motor. The support wheel 124 is supported for rotation on a shaft 127 which has opposite ends thereof attached to respective floating bars 122 downstream of the shaft 121.

As shown, the wheels 118 and 123 extend into the interior of the guide chute 80 through a slot in the top wall of the chute, whereas the wheels 120 and 124 extend through a slot in the bottom wall of the chute. As seen in FIG. 16, the slots are located centrally between the side walls of the guide chute for engaging the central longitudinal region of the expanded folded strip passing though the guide chute.

Each floating bar 122 has attached thereto a pair of guide pins 128 which are guided by holes in a respective guide plate 132 attached to the side plates. The guide plates may function as convenient mounts for the guide chute 80 which is attached thereto by suitable brackets or other means.

The guide pins 128 extend substantially perpendicular to the movement path of the stock material between the feed and support wheels 118 and 120 (perpendicular to the wide dimension of the guide chute 80) and have thereon respective springs 136 which resiliently bias the floating bar and thus the support wheel 120 towards the feed wheel 118. As shown, the springs are interposed between the guide plate and stops 138 on the remote ends of the guide pins. The guide pins preferably extend through oversized guide holes in the respective guide plate to permit tilting movement of the floating bars with respect to the frame about a transversely extending axis while the longitudinal position of the floating bars is maintained by the ends of the shaft 127 being guided in elongated slots 142 in the side plates 110 and 112, which slots extend substantially perpendicular to the movement path of the stock material between the feed and support wheels. Thus, while tilting movement is permitted, the axes of the compression wheel 123 and corresponding support wheel 124 will be held in alignment relative to the movement path of the strip of material passing therebetween. When material is not being fed through the machine, the springs 136 will resiliently hold the wheels of each pair against one another, or with a small gap therebetween by reason of the floating bars engaging the guide plates.

In the illustrated embodiment, the two shafts 119 and 125 are driven positively by the motor 126, the shaft 125 through a drive chain 148 and the shaft 119 through a drive chain 150 trained around sprockets respectively secured to the shafts 119 and 125. The sprockets are selected such that the shaft 119 will rotate faster than the shaft 125 at a desired speed ratio. Of course, it will be appreciated that other drive mechanisms may be employed if desired, such as gear trains.

Figure 19:
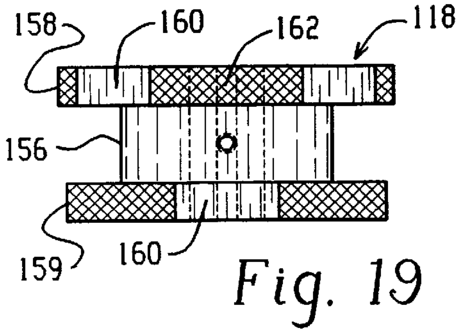
FIG. 19 is an edge view of an upper feed input wheel forming a part of the feed, crumpling and assembly device.
Figure 20:
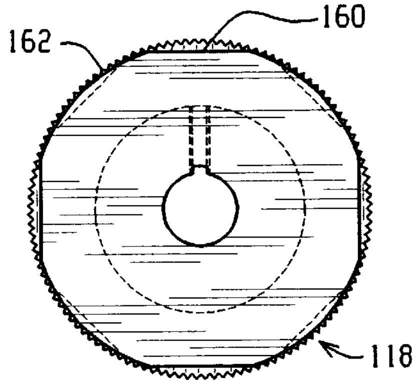
FIG. 20 is a side view of the upper feed input wheel of FIG. 19.

As further shown in FIGS. 19 and 20, the feed wheel 118 is generally cylindrical in shape, with a middle portion 156 in the form of an annular groove which, for example, may have an approximately semi-circular cross section or a rectangular cross-section. The feed wheel also has opposite axial end portions 158 and 159, each of which has a cylindrical periphery interrupted at regular intervals by flat faces 160. The flat faces 160 of the axial end portion 158 are opposite arcuate areas 162 of the axial end portion 159, while inversely the flat faces of the axial end portion 159 are opposite arcuate areas of the axial end portion 158. The arcuate areas are preferably knurled or otherwise provided with friction-enhancing means for relatively slip free engagement with the stock material.

Figure 17:
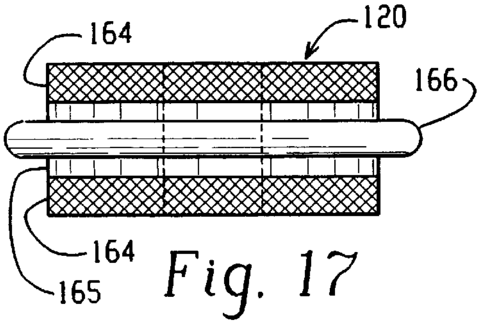
FIG. 17 is an edge view of a lower support input wheel forming a part of the feed, crumpling and assembly device.
Figure 18:
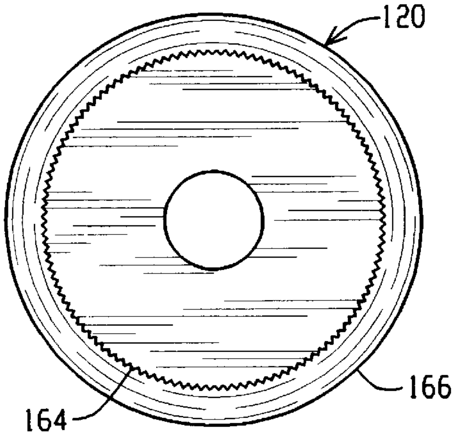
FIG. 18 is a side view of the lower support input wheel of FIG. 17.

As further shown in FIGS. 17 and 18, the support wheel 120, which coacts with the feed wheel 118, has a generally cylindrical shape at axial end portions 164 thereof which are disposed on opposite sides of a middle section 165 where there is provided a radially outwardly protruding annular rib 166 which is rounded. The cylindrical end portions 164 preferably are knurled or otherwise provided with friction-enhancing means for relatively slip free engagement with the stock material.

The expanded stock material leaving the expanding device, and consisting of one or more paper plies folded onto themselves, passes between the wheels 118 and 120, and is fed forwardly by the feed wheel 118. The expanded folded strip or band of material will be pinched along the central region thereof with a variable force, as explained further below, by the support wheel 120, when passing between the arcuate areas 162 of axial end portions 158 and 159 and the cylindrical axial end portions of the wheel 120. The central region of the expanded folded strip, however, will be relatively free when passing between the flat faces 160 and the cylindrical axial end portions 164 of the support wheel 120. Because of the offset between the flat faces of the axial end portions 158 and 159, the strip will therefore be fed alternately from each side of its longitudinal axis, instead of being pulled only axially. This advance by successive pulls from one side and then the other back and forth makes it possible to have at the center a surplus of paper with respect to its flat configuration, this surplus being generated by the rib 166 fitting in the groove 156, which provides crumpling.

Figure 21:
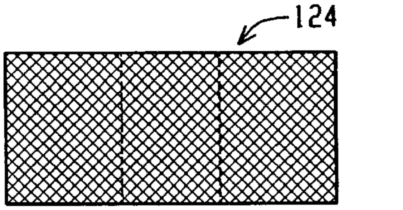
FIG. 21 is an edge view of a lower support output wheel forming a part of the feed, crumpling and assembly device.
Figure 23:
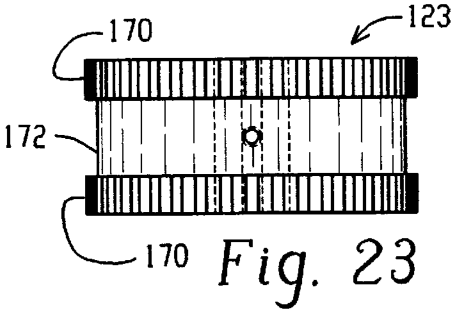
FIG. 23 is an edge view of an upper compression output wheel forming a part of the feed, crumpling and assembly device.
Figure 22:
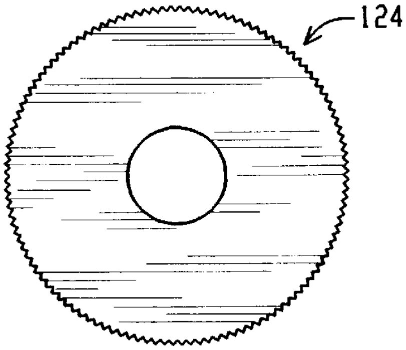
FIG. 22 is a side view of the lower support output wheel of FIG. 21.
Figure 24:
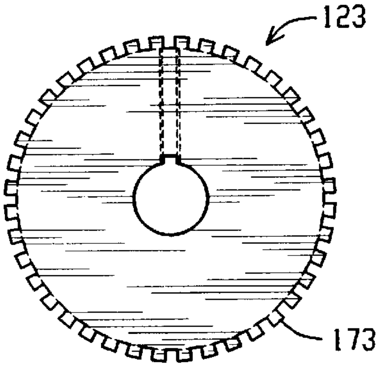
FIG. 24 is a side view of the upper compression output wheel of FIG. 23.

As further shown in FIGS. 23 and 24, the compression wheel 123 is generally cylindrical in shape and has two end portions 170 having knurled or ribbed cylindrical surfaces separated by a radially relieved middle portion 172 which may have a smooth outer diameter surface. The ribbing on the end portions forms circumferentially spaced apart teeth that preferably are flat at their radially outer ends. The support wheel 124, further shown in FIGS. 21 and 22, is a cylinder which may have a smooth outer diameter surface or one provided with knurling or other friction-enhancing means on which the ribbing will roll, the strip of material coming from the first pair of wheels and being pinched between the teeth or ribbing 173 of the compression wheel and the outer diameter surface of the support wheel, with a variable force, as explained further below.

The force exerted by the springs 136 may be distributed in such a way that the pressure exerted by the wheel 120 is greater than that exerted by the wheel 124. This difference in forces is justified by the fact that the wheel 120 works with the feed wheel 118, and must therefore pinch the material proportionally more than the wheel 124, which only serves as support for the assembly teeth on axial end portions 170. The ratio of forces may be from 1/3 to 2/3, but this can be different if desired by changing the springs with springs having different spring constants or by changing the position of the stops on the guide pins, for example.

As above mentioned, the motor 126, driving the wheel 123, also drives the wheel 118 in the same direction but at a higher speed. The result is that the strip of material leaving the pair of wheels 118 and 120 is going to be retarded by the pair of wheels 123 and 124 rotating at a slower speed. As a result, the material will be compressed between the two pairs of wheels, constantly creating a series of transverse folds. Crumpling of the material results from this difference in speed of rotation of the two pairs of wheels, the upstream pair turning faster than the downstream pair. The speed ratio may be on the order of about 1.7:1 to about 1.9:1. Of course, the speed ratio could be different, according to circumstances, for example the degree of crumpling desired. In the same way, the aforesaid ratio may be valid for wheels 118 and 123 of the same diameter, but it could be different for wheels of different diameters.

For further information regarding a feeding, crumpling and connecting assembly similar to that just described, reference may be had to European Patent Application No. 94440027.4, filed Apr. 22, 1994 and published on Nov. 2, 1995 under Publication No. 0 679 504 A1, which is hereby incorporated herein by reference.

The conversion machine also preferably comprises the strip dividing assembly 34 that divides or separates the connected strip exiting from between the downstream pair of wheels into sections of desired length. In the illustrated embodiment the separating assembly is in the form of a cutting assembly that cuts the thus produced continuous strip at a desired length to form a cushioning product of desired length. In this manner, the length of the cushioning product may be varied depending on the intended application. The particular construction and operation of the strip-cutting assembly is not essential to the present invention. However, reference may be had to U.S. patent application Ser. No. 08/386,355 for a cutting assembly similar to that illustrated, or to U.S. patent application Ser. Nos. 08/110,349 and 08/478,256 for other types of cutting assemblies. Reference may also be had to U.S. patent application Ser. No. 08/486,811 now U.S. Pat. No. 5,618,131 for details of a single handle operator for operating the cutting assembly and also for controlling the motor. The handle operator is shown at 172 in FIGS. 14 and 15. These patent applications are hereby incorporated herein by reference for their showings of cutting and handle operator assemblies.

The cushioning product produced by the machine is essentially the same as that produced by a machine like that shown in the above mentioned European Patent Application No. 94440027.4.

Although the invention has been shown and described with respect to certain preferred embodiments, it is obvious that equivalent alterations and modifications will occur to others skilled in the art upon the reading and understanding of this specification. The present invention includes all such equivalent alterations and modifications.

What is claimed is:

1. A continuous web of flat folded sheet stock material for use in a cushioning conversion machine, comprising at least one ply of sheet stock material suitable for use in forming a resilient cushioning product, said at least one ply having a central portion and lateral edge portions, the lateral edge portions being folded over the central portion to form with the central portion a plurality of layers each joined at a longitudinally extending fold to at least one other layer, the lateral edge portions being at least partially coextensive with one another and with the central portion such that at least a portion of the flat folded sheet stock material is three layers thick, the lateral edge portions being folded over on the same side of the central portion, the lateral edge portions at least partially overlapping, and at least two of the layers being free to separate from one another to permit crumpling of said stock material as it travels through the conversion machine wherein said stock material is paper.

2. A web as set forth in claim 1, wherein the lateral edge and central portions are of approximately equal width.

3. A web as set forth in claim 1, wherein said at least one ply includes a plurality of plies.

4. A web as set forth in claim 1 wherein said stock material is coiled into a roll.

5. A web as set forth in claim 1 wherein said stock material is fan-folded into a stack.

6. A web as set forth in claim 1, wherein the lateral edge portions substantially overlap.

7. A stock material for use in a cushioning conversion machine, comprising one or more plies, at least one ply having a central portion and lateral edge portions, the lateral edge portions being folded over on the central portion to form with the central portion a plurality of layers each joined at a longitudinally extending fold to at least one other layer, the lateral edge portions being at least partially coextensive with one another and with the central portion such that at least a portion of the stock material is three layers thick, the lateral edge portions being folded over on the same side of the central portion, the lateral edge portions at least partially overlapping, and at least two of the layers being free to separate from one another to permit crumpling of said stock material as it travels through the conversion machine wherein said one or more plies are paper.

8. A stock material as set forth in claim 7, wherein the lateral edge portions substantially overlap.

9. A stock material as set forth in claim 7, wherein the lateral edge portions and central portion are of approximately equal width.

10. A stock material as set forth in claim 7 comprising a plurality of plies.

11. A stock material as set forth in claim 7 wherein said one or more plies are coiled into a roll.

12. A stock material as set forth in claim 7 wherein said one or more plies are fan-folded into a stack.

* * * * *